Aug. 5, 1958  B. WEISS  2,845,835
PHOTOGRAPHIC LENS SHADE
Filed May 6, 1954
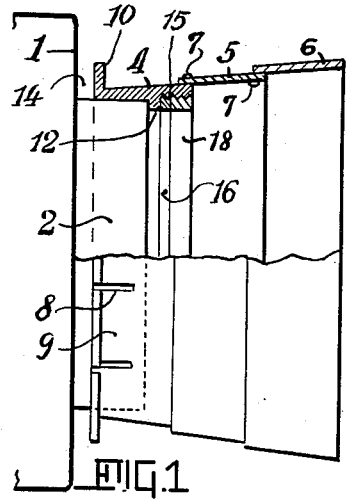
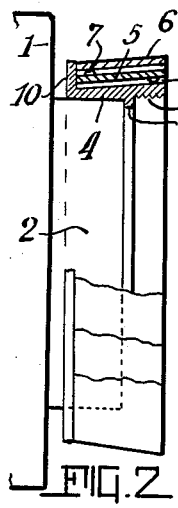
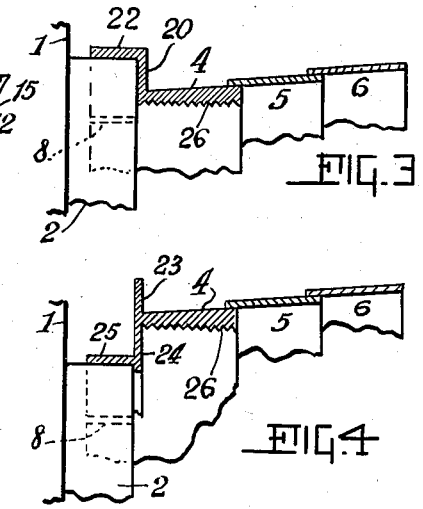
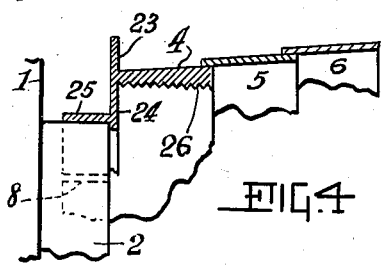
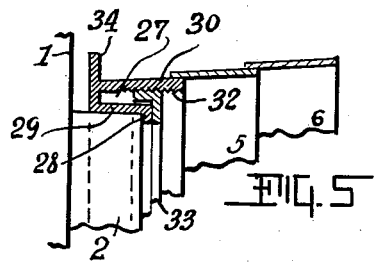
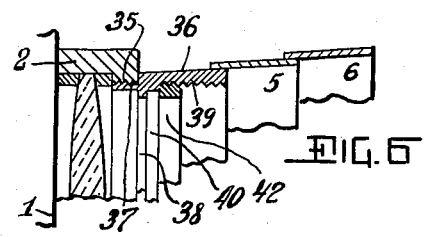
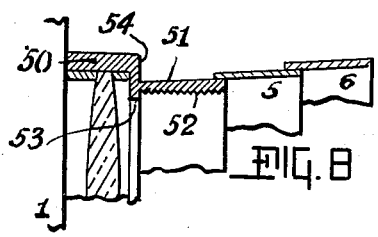
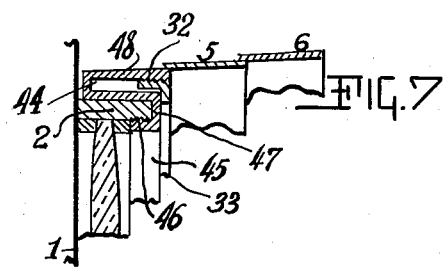
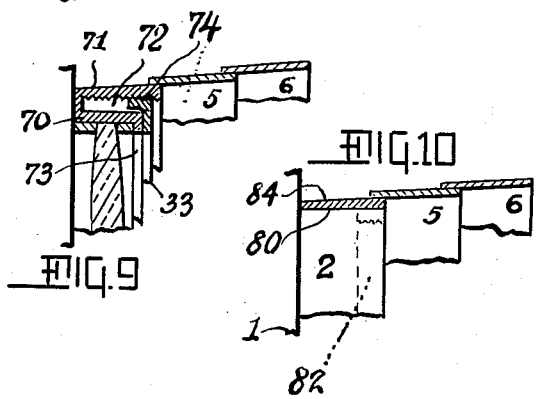
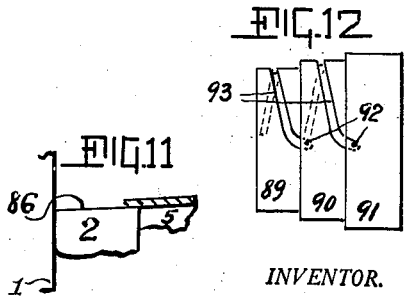
INVENTOR.
BERNARD WEISS
BY
Ivan E. A. Konigsberg

United States Patent Office 2,845,835
Patented Aug. 5, 1958

2,845,835

PHOTOGRAPHIC LENS SHADE

Bernard Weiss, New York, N. Y.

Application May 6, 1954, Serial No. 427,906

5 Claims. (Cl. 88—1)

This invention relates to photographic lens shades of the type which consists of a series of telescoping rings adapted to form when in extended position a conical shield for the lens of a camera. One object of the invention is to provide a lens shade which may be permanently or detachably attached to the lens mount of a camera and the telescoping rings of the lens shade collapsed upon the lens mount so as to occupy the least possible space on the circumferential surface of the mount to avoid interference with the closing upon the lens mount of the lid of a camera carrying case or the foldable front board of a folding camera.

Another object is to provide the lens shade rings with means for preventing relative movements between the rings when the shade is collapsed. Another object is to provide the lens shade with means for mounting lens accessories within the innermost ring of the shade. Still another object is to provide a lens shade adapted for use upon a lens mount which has an interiorly threaded portion. Other objects are to provide a collapsible lens shade with means whereby the shade may be used upon lens mounts of different diameters; to provide a structure in which the innermost shade ring may be integral with the lens mount; and to provide a structure in which the innermost ring be of different cross sectional formations. Accordingly the invention is embodied in lens shade rings constructed as hereinafter described and claimed and as shown in the accompanying drawing in which Fig. 1 shows a lens shade embodying the invention with the shade rings expanded to form a conical shield for the lens, parts being in section and parts broken away.

Fig. 2 is a similar view showing the shade rings collapsed upon the lens mount.

Figs. 3 and 4 show modifications in the construction of the inner shade ring to suit lens mounts of different diameters.

Fig. 5 shows an innermost shade ring of U-formation.

Fig. 6 shows a lens shade mounted upon a lens mount which has an interiorly threaded portion.

Fig. 7 is a modification of Fig. 6, the innermost shade ring being of U-formation.

Fig. 8 shows a lens shade with the innermost ring integral with the lens mount.

Figs. 9, 10 and 11 are modifications of the construction shown in Fig. 8.

Fig. 12 shows the lens shade rings rotatably mounted upon the lens mount.

At the outset it should be noted that nearly all the elements illustrated in the drawing are drawn very much enlarged and of greater thickness than when actually constructed. In the manufacture of the lens shade the shade rings will be very thin and the other parts will be dimensioned according to the usual precise methods followed in the manufacture of cameras.

In the several figures of the drawing, a camera is indicated at 1 with a lens mount 2 of usual construction in the art. The lens shade consists of the telescoping rings 4, 5 and 6 which may frictionally engage each other. The conical shape of the rings prevents separation thereof. In order to prevent relative movements across the rings when they are collapsed, one ring, the ring 5 for example, may be provided with buttons or other like suitable elements 7 which, as shown in Fig. 2, engage the adjacent rings and thus prevent such relative movements between the rings. The means 7 are shown by way of example in Figs. 1 and 2 and may be included in the other embodiments illustrated.

The lens shade may be permanently or detachably secured upon the lens mount by any suitable means. For example, the innermost ring 4 may be notched as at 8 to provide gripping segments 9 to allow the ring to be slightly expanded to grip the lens mount. Other means, such as screw threads may be used as will appear hereinafter. The ring 4 has an outer flange 10 to serve as a stop flange or rest for the other rings 5 and 6 when the shade is collapsed as in Fig. 2. The flange 10 prevents the edges of the outer rings from abutting the face of the camera.

The ring 4 is also provided with an inner annular flange 12 which abuts the face of the lens mount and serves as a stop to limit the axial inward movement of the shade upon the mount, it being desirable, in some cases, to leave a space 14 upon the mount free for observation of photographic indicia which may appear upon the circumference of the lens mount or which may be placed upon the face of the camera. On the other hand, and it is within the intent and scope of this disclosure, the lens shade, as shown in Figs. 9–11, may be collapsed so as to occupy all of the circumferential surface of the lens mount. This is especially desirable when the camera is provided with a folding cover or the like which closes directly upon the lens mount.

The innermost ring may be provided with means for securing additional lens accessories, known in the art, in front of the lens. The ring may therefore be threaded internally as at 15, Fig. 1, and a filter or lens cover or like element 16 may be placed in front of the lens and secured by a retaining ring 18 which is screwed into the ring 4.

Fig. 3 shows a modification in which the innermost ring 4 is formed with an enlarged outer flange for securing the lens shade upon a lens mount 2 which has a diameter larger than the diameter of the inner opening of the lens shade. The flange portion 20 engages the face of the lens mount and the other flange portion 22 grips the circumferential surface of the mount. It may be slotted like the ring 4 in Fig. 1. The flange portion 20 also serves as a stop for the edges of the rings 5 and 6 when the shade is collapsed.

Fig. 4 shows a modification for attaching the lens shade upon a lens mount which is of a diameter smaller than the diameter of the inner opening of the shade. The ring 4 may then be provided with integral flanges 23, 24 and 25. The flanges 23 and 24 correspond to the flanges 10 and 12, respectively, in Fig. 1. The flange 25 is the attaching flange to grip the lens mount and it may therefore be slotted as at 8 as shown. The innermost ring 4 in Figs. 3 and 4 may be provided with inner threads 26 for receiving lens accessories and a retaining ring.

Fig. 5 shows a modification in which the ring 4 is of U-formation in cross section. The ring 27 is substantially of the same length as the available space on the lens mount 2 and includes an axial movement limiting flange 28 extending from the inner leg 29 of the U-form. The outer leg 30 is threaded as at 32 within the U to receive a retaining ring 33 if such be used. The U- formed ring 27 is also provided with a ring stop flange 34 and may be held on the mount by friction.

Some lens mounts may include interior screw threads as shown at 35 in Fig. 6. The innermost ring 36 of the lens shade is then threaded exteriorly as at 37 and screwed into the lens mount. The ring 36 also has the axial stop flange 38 and inner threads 39 to receive a lens accessory 40 with retaining ring 42.

Fig. 7 shows a double U-formed innershade ring 44 in which the inner U-leg 45 has threads which engage threads on the lens mount as shown at 46 to secure the ring to the mount. The cross bar 47 of the U-form serves as an axial stop similar to the flange 12 in Fig. 1. Interior threads 32 are formed in the outer U-leg 48 similar to the threads 32 in Fig. 5. In this modification, the innermost ring is shown without a stop flange for the rings 5 and 6, it being understood that if there is no particular reason for providing such a stop flange such as the flange 10 in Fig. 1, such stop flange may be omitted.

Fig. 8 shows a camera lens mount 50 with an annular integral forward extension 51 which is utilized as an innermost shade ring. It is threaded as at 52 for the attachment of lens accessories inserted against a stop flange 53. The lens mount also forms a face portion 54 which serves as a stop flange for the edges of the rings 5 and 6 when they are collapsed.

Fig. 9 shows a modification in which the rim or outer circumferential portion of the lens mount is of U-formation in cross section forming an inner U-leg 70 with a stop flange 73 similar to the flange 53 in Fig. 8. The outer U-leg 71 supports the lens shade rings 5 and 6. The lens mount also has an annular groove 72 within the U. The groove is threaded as at 74 for the reception of an accessory retaining ring 33 as in Fig. 7.

Fig. 10 shows a modification in which the innermost ring 80 is shrunk on or otherwise made a part of the lens mount 2. The latter has a space 82 for lens accessories if desired. The ring 80 has a conical outer surface 84 for the support of the other rings 5 and 6.

In Fig. 11 the lens mount itself may have an outer conical surface 86 for the support of the other shade rings.

Fig. 12 shows a modification in which the middle and the outer rings 90 and 91 have pins 92 which are adapted to move in guide grooves 93 in the middle and the inner ring 89 so that the lens shade may be expanded and collapsed by a rotative movement instead of the push and pull movement of the lens shade rings described above.

The several embodiments of the invention disclose an innermost shade ring or member having an outer inclined annular surface upon which the intermediate shade ring slides in parallelism and, in turn, the outermost shade ring slides upon the intermediate shade ring in parallelism. The two outer rings are of conical formation in cross section.

The invention provides a collapsible or telescoping lens shade which is adapted for use upon differently constructed lens mounts and which is provided with means for securing within the innermost ring of the shade suitable lens accessories of known form to be maintained in position by a suitable retaining ring.

Inasmuch as the disclosure is susceptible of changes and modifications in the details of construction shown and described I claim all such changes and modifications as come within the principle and scope of the appended claims.

I claim:

1. In a photographic camera, the combination with an objective lens mount, a lens shade for said camera consisting of an innermost shade ring having an inclined unobstructed unbroken smooth annular outer surface extending substantially the entire depth of the ring; an intermediate shade ring of conical formation in cross section adapted to closely fit upon and slide upon the innermost shade ring parallel with and in contact with the entire smooth outer surface of said innermost shade ring; an outermost shade ring being also of conical formation in cross section and adapted to closely fit upon and slide upon the said intermediate shade ring parallel with and in contact with the exterior surface of said intermediate shade ring, said intermediate and outermost shade rings being in telescopic relation to one another and to said innermost shade ring so as to form when in extended position a conical lens shade for the objective camera lens, means on the innermost shade ring for securing the same to the objective lens mount of the camera, means on the innermost shade ring for securing a photographic accessory thereto in front of the objective lens and means on the said intermediate shade ring engaging the other two rings to prevent relative movements of the shade rings when the said lens shade is collapsed upon the said lens mount, said last named means comprising outwardly extending projections adjacent the rear edge of the intermediate shade ring and inwardly extending projections adjacent the forward edge of the intermediate shade ring.

2. A photographic lens shade according to claim 1 in which said lens mount has an interiorly threaded portion, screw threads on the outer circumference of said innermost shade ring engaging said interior threads for attaching the lens shade to the lens mount, said innermost shade ring having screw threads on the inside thereof for the reception of lens accessories for the lens in said lens mount.

3. A photographic lens shade according to claim 1 in which the said innermost shade ring is of U-formation in cross section and includes an annular stop flange for the inner edge of the telescoping shade rings when the latter are collapsed.

4. A photographic lens shade according to claim 1 in which the innermost shade ring is of U-formation in cross section, the inner leg of the U-formation enclosing the lens mount of the camera and forming a flange abutting the face of the lens mount for limiting the inward axial movement of the lens shade when it is attached upon the lens mount, the outer leg of the said U-formation having a stop flange for the telescoping shade rings and screw threads on the inside of said outer U-leg within the U-formation for the reception of lens accessories and a retaining ring therefor.

5. A photographic lens shade according to claim 1 in which at least two of the telescoping shade rings are provided with guide pins engaging cooperating guide grooves in the adjacent telescoping shade rings for expanding and collapsing the said lens shade by a rotative movement of the said telescoping rings.

References Cited in the file of this patent

UNITED STATES PATENTS

| | | |
|---|---|---|
| 1,848,879 | Halsbach | Mar. 8, 1932 |
| 1,966,149 | Stevens | July 10, 1934 |
| 2,150,626 | Kuppenbender | Mar. 4, 1939 |
| 2,197,184 | Kemp | Apr. 16, 1940 |
| 2,268,341 | Nerwin | Dec. 30, 1941 |
| 2,498,581 | Rogers | Feb. 21, 1950 |

FOREIGN PATENTS

| | | |
|---|---|---|
| 20,706 | Great Britain | of 1907 |
| 258,866 | Switzerland | June 1, 1949 |